United States Patent [19]

Goto et al.

[11] 4,404,320

[45] Sep. 13, 1983

[54] POLYURETHANE COMPOSITION FOR POWDER COATING

[75] Inventors: Jugo Goto, Kawanishi; Kazutaka Mochizuki, Osaka; Tsutomu Kubota, Kyoto; Reiji Miyamoto, Ichihara, all of Japan

[73] Assignee: Takeda Chemical Industries, Osaka, Japan

[21] Appl. No.: 292,187

[22] Filed: Aug. 12, 1981

[30] Foreign Application Priority Data

Aug. 18, 1980 [JP] Japan ................... 55-113703

[51] Int. Cl.$^3$ ................... C08L 29/04; C08L 75/06
[52] U.S. Cl. ................................ 525/58; 525/124
[58] Field of Search .............................. 525/58, 124

[56] References Cited

U.S. PATENT DOCUMENTS

| | | | |
|---|---|---|---|
| 3,024,216 | 3/1962 | Smitahs | 525/58 |
| 3,400,173 | 9/1968 | Reischl | 525/58 |
| 3,822,240 | 7/1974 | Schmitt | 525/58 |
| 3,875,090 | 4/1975 | Levy | 525/58 |
| 4,222,926 | 9/1980 | Mizuno | 525/58 |
| 4,247,666 | 1/1981 | Mochizuki | 525/124 |

FOREIGN PATENT DOCUMENTS 51-37676 10/1976 Japan ........................ 525/58

*Primary Examiner*—Paul Lieberman
*Attorney, Agent, or Firm*—Wenderoth, Lind & Ponack

[57] ABSTRACT

A polyurethane based composition for powder coating uses, which comprises a combination of an organic polyisocyanate compound and a hydroxyl-containing compound, the hydroxyl-containing compound being (A) A hydroxyl-containing polymer, or its carboxyl-modified product, obtained by hydrolyzing a copolymer of a vinyl ester of a saturated monocarboxylic acid and other polymerizable vinyl monomers, and (B) A polyester polyol of softening point of not lower than 40° C. containing not less than 30 weight % of cyclohexylene or cyclohexenylene group or spiro rings.

The composition provides coating film exhibiting exceedingly improved hardness, heat resistance, toughness and transparency as compared with the conventional polyolefin based powder coatings.

11 Claims, No Drawings

POLYURETHANE COMPOSITION FOR POWDER COATING

This invention relates to compositions for powder coating uses which provide coating films that are tough and have excellent transparency and flexural or bending properties.

Hydroxyl-containing polymers obtained by hydrolyzing copolymers of ethylene and vinyl esters of saturated monocarboxylic acids, or their carboxyl-modified products, possessing increased adhesion toward metals, glass, textiles, etc. and providing resulting coating films with improved transparency, chemical resistance, weatherability, etc., having conventionally been in wide use as anticorrosive paints, hot-melt adhesives, film adhesives, textile adhesives, bottle coating agents, etc.

However, hydroxyl-containing polymers obtained by hydrolyzing copolymers of ethylene and vinyl esters of saturated monocarboxylic acids, or their carboxyl-modified products, exhibit lowered softening points and therefore suffer the serious disadvantage that even when curing with blocked products of organic polyisocyanates the coating films thus-produced possess decreased hardness, lowered second-order transition points and deteriorated physical properties upon exposure to high temperatures.

The present inventors, after extensive research studies conducted in view of such circumstances, have found that the combined use of hydroxyl-containing polymers, or their carboxyl-modified products, obtained by hydrolyzing copolymers of ethylene and vinyl esters of saturated monocarboxylic acids with polyester polyols of softening points of not lower than 40° C., containing not less than 30 weight % of cyclohexylene or cyclohexenylene groups or spiro rings, yield polyurethane based compositions for powder coating uses which provide coating films having tough physical properties, particularly a suitable degree of surface hardness as well as distinguished impact, chemical and water resistance, and, based on the finding, the present invention has been perfected.

Thus, this invention relates to polyurethane based compositions for powder coating uses, which comprises a combination of organic polyisocyanate compounds and hydroxyl-containing compounds, the hydroxyl-containing compounds being (A) hydroxyl-containing polymers, or their carboxyl-modified products, obtained by hydrolyzing copolymers of vinyl esters of saturated monocarboxylic acids and other polymerizable vinyl monomers and (B) polyester polyols of softening point of not lower than 40° C. containing not less than 30 weight % of cyclohexylene or cyclohexenylene group or spiro rings.

(A) The hydroxyl-containing polymers obtained by hydrolyzing copolymers of vinyl esters of saturated monocarboxylic acids an other polymerizable vinyl monomers, which are useful in this invention, include those obtained by hydrolyzing copolymers from vinyl esters of aliphatic saturated monocarboxylic acids such as vinyl acetate and vinyl propionate, particularly vinyl acetate, and polymerizable vinyl monomers such as ethylene, propylene, butadiene, isoprene, chloroprene, styrene, methylstyrene, chlorostyrene, vinyl chloride, vinyl bromide, vinyl fluoride, vinylidene chloride, acrylonitrile and methyl vinyl ether, particularly ethylene.

As the carboxyl-modified products of the abovementioned hydroxyl-containing polymers, there may be mentioned (a) carboxyl-containing modified products obtained by grafting the above-mentioned hydroxyl-containing polymers with carboxyl-containing vinyl monomers such as acrylic acid, methacrylic acid and maleic acid, (b) carboxyl-containing modified products obtained by adding on to the above-mentioned hydroxyl-containing polymers aliphatic, alicyclic or aromatic acid anhydrides such as succinic anhydride, maleic anhydride, fumaric anhydride, citraconic anhydride, itaconic anhydride, endeic anhydride, methylenedeic anhydride, chlorendic anhydride, phthalic anhydride, hexahydrophthalic anhydride, tetrahydrophthalic anhydride, methylhexahydrophthalic anhydride or methylhymic anhydride, or (c) carboxyl-containing modified products obtained by grafting the above-mentioned hydroxyl-containing polymers with carboxyl-containing vinyl monomers, followed by adding acid anhydrides. Said carboxyl-modified products preferably have acid value of about 0 to 20, more preferably about 0.1 to 10. And those with softening points of not lower than about 40° C. can be conveniently used.

These modified products can be produced, for example, by the procedure described below.

In the first place, a copolymer of a vinyl ester of a saturated carboxylic acid and another polymerizable vinyl monomer is subjected to a hydrolytic reaction, whereby particularly preferred is a copolymer of vinyl acetate and ethylene, normally with a ratio of both monomers suitably being in the range of about 5 to 50 mole % of the former and about 50 to 95 mole % of the latter and wherein; molecular weight of the copolymer preferably is about 2,000 to 1,000,000. The hydrolytic reaction of said copolymer can be conducted by the procedures known per se (e.g., the specification of U.S. Pat. No. 2,386,347, etc.). For example, the reaction can be conducted in a system consisting of low-boiling alcohols such as methanol, ethanol and propanol and alkali catalysts such as sodium methylate and sodium hydroxide, and may be carried out in the presence of organic solvents such as benzene, toluene and xylene. The percentage of hydrolysis is desirably in the range of 10 to 100%. Conditions of the hydrolytic reaction are varied more or less according to the desired percentage of hydrolysis, and the reaction can be normally at a temperature of 10° to 100° C. for 10 to 180 min.

The hydroxyl-containing polymer thus obtained is subjected to a carboxyl-modification reaction, if necessary. The carboxyl-modification reaction includes procedures comprising a graft-reaction of the hydroxyl-containing polymer obtained by the above-mentioned procedure with, for example, a carboxyl-containing vinyl monomer and/or reaction with an acid anhydride. In the case of grafting with a carboxyl-containing vinyl monomer, such reaction is normally conducted by adding a radical producing substance in the presence or absence of a suitable solvent (e.g., aliphatic hydrocarbons such as hexane and heptane, alicyclic hydrocarbons such as cyclohexane, aromatic hydrocarbons such as benzene, toluene and xylene, halogenated hydrocarbons such as carbon tetrachloride, trichrene, perchrene and chlorobenzene, and other solvents such as butanol, methyl ethyl ketone, methyl isobutyl ketone, dioxane and cyclohexanone), followed by heating, whereby the radical producing substance means substances capable of easily decomposing at temperatures where the graft polymerization is effected to give free radicals and includes organic peroxides such as benzoyl peroxide, lauroyl peroxide and dicumyl peroxide and nitrogencontaining compounds such as α,α'-azobisisobutylonitrile. These radical-producing substances are utilized in the proportion of about 0.05 to 3 weight %, preferably about 0.1 to 1 weight %, against the hydroxyl-containing polymer. In the above reaction, the heating temperature, varying with type of carboxyl-containing unsaturated monomers or solvents utilized, cannot be absolutely mentioned, but is about 50° to 150° C., with the heating time being about 0.1 to 5 hours.

In the case of the reaction with acid anhydrides, on the other hand, such reaction is conducted by heating in the presence or absence of an appropriate solvent at about 50° to 150° C. for about 0.1 to 5 hours. In the above reaction, the acid anhydride is supposed to undergo ring-opening with OH group contained in the hydrolyzed product to form:

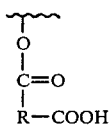

Next, (B) the polyester polyols of softening point of not lower than 40° C. containing not less than 30 weight % of cyclohexylene or cyclohexenylene groups or spiro rings as referred to in this invention are obtained by conducting esterification by the procedures known per se while utilizing glycol components such as hydrogenated bisphenol A, hydrogenated bisphenol B, 1,4-cyclohexanediol, 1,4-cyclohexanedimethanol, 3,9-bis(1,1-bismethyl-2-oxyethyl)-2,4,8,10-tetraoxaspiro[5,5]undecane (hereinafter referred to briefly as spiroglycol) and the adducts of spiroglycol and alkylene oxide such as ethylene oxide, propylene oxide, butylene oxide etc. (hereinafter referred to briefly as spiro ether glycol) and acid components such as methyltetrahydrophthalic acid (anhydride), tetrahydrophthalic acid (anhydride), methylhexahydrophthalic acid (anhydride) and hexahydrophthalic acid (anhydride), spiro[2,6]nonane 1,2-dicarboxylic acid in such a way that the cyclohexylene or cyclohexenylene group or spiro rings content may be not less than about 30 weight %, particularly preferably not less than about 45 weight %, and their softening point is not lower than 40° C., preferably in the range of about 50° to 150° C., and most preferably about 60° to 120° C. The cyclohexylene groups may be any of, for example a, 1,2-cyclohexylene group a, 1,3-cyclohexylene group a, 1,4-cyclohexylene group and the like, while the cyclohexenylene groups may be any of, for example a, 1-cyclohexyenylene group a, 2-cyclohexenylene group a, 3-cyclohexenylene group and the like. The term, "spiro rings", as used herein, denotes two rings which constitute a spiro union. The spiro rings may be any of, for example, spiro[2,6]nonane ring, 2,4-dioxaspiro[5,5]undecane ring, 2,4,8,10-tetraoxaspiro[5,5]undecane ring and the like.

The hydroxyl number of the polyester polyols is normally in the range of about 5 to 300 mgKOH/g, preferably about 20 to 200 mgKOH/g, and their molecular weights are in the range of about 300 to 10,000, preferably about 500 to 5,000.

As examples of the components other than the one containing a cyclohexylene or cyclohexenylene group or spiro rings which are used in the production of the abovementioned polyester polyols, there may be mentioned polycarboxylic acids (or their anhydrides) such as maleic acid (anhydride), succinic acid (anhydride), adipic acid, fumaric acid, phthalic acid (anhydride), terephthalic acid, isophthalic acid, sebacic acid, dodecanoic acid, azelaic acid, glutaric acid and trimellitic acid (anhydride) and polyhydric alcohols such as ethylene glycol, propylene glycol, butylene glycol, hexylene glycol, decanediol, neopentyl glycol, glycerol, trimethylolpropane, pentaerythritol and neopentyl glycol ester of hydroxypivalic acid.

In this invention, (A) the hydroxyl-containing polymers, or their carboxyl-modified products, obtained by hydrolyzing copolymers of vinyl esters of saturated monocarboxylic acids and other polymerizable vinyl monomers, and (B) the polyester polyols of softening point of not lower than 40° C. containing not less than 30 weight % of cyclohexylene or cyclohexenylene group or spiro rings, as mentioned in the above, are used in combination with organic polyisocyanate compounds.

The organic polyisocyanate compounds, which are useful in this invention, include blocked isocyanates obtained by the reaction of organic polyisocyanates with blocking agents to nearly completely block the isocyanate groups in the organic polyisocyanates (completely blocked isocyanate compounds) or to partially block such isocyanate groups (partially blocked isocyanate compounds) or mixtures thereof.

The partially blocked isocyanate compounds contain free isocyanate groups as well as blocked ones.

In the partially blocked isocyanate compounds, there may be contained the organic polyisocyanates.

As the organic polyisocyanates there may be mentioned, for example, aliphatic diisocyanates such as trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate 2,4,4- or 2,2,4-trimethylhexamethylene diisocyanate, dodecamethylene diisocyanate and 2,6-diisocyanatomethyl caproate; cycloalkylene diisocyanates such as 1,3-cyclopentane diisocyanate, 1,4-cyclohexane diisocyanate, 1,3-cyclohexane diisocyanate, 3-isocyanatomethyl-3,5,5-trimethylcyclohexyl isocyanate 4,4'-methylenebis(cyclohexylisocyanate), methyl-2,4-cyclohexane diisocyanate, methyl-2,6-cyclohexane diisocyanate, 1,4-bis-(isocyanatomethyl)cyclohexane and 1,3-bis-(isocyanatomethyl)cyclohexane; aromatic diisocyanates such as m-phenylene diisocyanate, p-phenylene diisocyanate 4,4'-diphenyl diisocyanate, 1,5-naphthalene diisocyanate, 4,4'-diphenylmethane diisocyanate, 2,4- or 2,6-tolylene diisocyanate 4,4'-toluidine diisocyanate, dianisidine diisocyanate and 4,4'-diphenyl ether diisocyanate; aromaticaliphatic diisocyanates such as 1,3- or 1,4-xylylene diisocyanate and ω,ω'-diisocyanate-1,4-diethylbenzene; triisocyanates such as triphenylmethane-4,4',4''-triisocyanate, 1,3,5-triisocyanatobenzene, 2,4,6-triisocyanatotoluene and ω-isocyanatoethyl 2,6-diisocyanatocaproate; tetraisocyanates such as 4,4'-diphenyldimethylmethane-2,2',5,5'-tetraisocyanate; polymeric polyisocyanates such as dimers and trimers of tolylene diisocyanate; polyphenylpolymethylenepolyisocyanates; organic polyisocyanates such as polyisocyanates, or their allophanate and biuret derivatives, obtained by the reaction of excessive amounts of the above-mentioned polyisocyanates with low-molecular-weight, active-hydrogen containing compounds, e.g. ethylene glycol, propylene glycol, dipropylene glycol, diethylene glycol, butylene glycol, trimethylolpropane, neopentyl glycol, hydrogenated bisphenol A, hexanetriol, glycerol, pentaerythritol, sorbitol, castor oil, ethylenediamine, hexamethylenediamine, ethanolamine, diethanolamine, triethanolamine, water, ammonia and urea.

Among the above organic polyisocyanates, especially, the aliphatic and alicyclic organic polyisocyanates such as hexamethylene diisocyanate, 1,3-bis-(isocyanatomethyl)cyclohexane, 1,4-bis(isocyanatomethyl)cyclohexane, isophorone diisocyanate, 4,4'-methylenebis(cyclohexylisocyanate), 1,3- or 1,4-xylylene diisocyanate and lysine diisocyanate are preferred.

As the blocking agents, use can be made of any of blocking agents known to be employable for the blocking of organic polyisocyanates such as those based on phenols, lactams, active methylene, alcohols, mercaptans, acid amides, imides, amines, imidazoles, ureas, carbamic acid salts, imines, oximes and sulfites. Among them, blocking agents based on phenols, oximes, lactams and imines are advantageously used. As specific examples of the blocking agents, there may be mentioned:

Phenol based blocking agents;
  Phenol, cresol, xylenol, nitrophenol, chlorophenol, ethylphenol, p-hydroxydiphenyl, t-butylphenol, o-isopropylphenol, o-sec-butylphenol, p-nonylphenol, p-t-octylphenol, hydroxybenzoic acid, hydroxybenzoic acid esters, etc.
Lactam based blocking agents;
  $\epsilon$-Caprolactam, $\delta$-valerolactam, $\gamma$-butyrolactam, $\beta$-propiolactam, etc.
Active-methylene based blocking agents;
  Diethyl malonate, dimethyl malonate, ethyl acetoacetate, methyl acetoacetate, acetylacetone, etc.
Alcohol based blocking agents;
  Methanol, ethanol, n-propyl alcohol, isopropyl alcohol, n-butyl alcohol, isobutyl alcohol, t-butyl alcohol, n-amyl alcohol, t-amyl alcohol, lauryl alcohol, benzyl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolates such as methyl glycolate, ethyl glycolate, and butyl glycolate, lactic acid, lactates such as methyl lactate, ethyl lactate and butyl lactate, methylolurea, methylolmelamine, diacetone alcohol, ethylene chlorohydrin, ethylene bromohydrin, 1,3-dichloro-2-propanol, $\omega$-hydroperfluoroalcohol, acetone cyanohydrin, etc.
Mercaptan based blocking agents:
  Butyl mercaptan, hexyl mercaptan, t-butyl mercaptan, t-dodecyl mercaptan, 2-mercaptobenzothiazole, thiophenol, methylthiophenol, ethylthiophenol, etc.
Acid-amide based blocking agents;
  Acetanilide, acetaniside, acetotoluide, acrylamide, methacrylamide, acetamide, stearic acid amide, benzamide, etc.
Imide based blocking agents;
  Succinimide, phthalimide, maleimide, etc.
Amine based blocking agents;
  Diphenylamine, phenylnaphthylamine, xylidine, N-phenylxylidine, carbazole, aniline, naphthylamine, butylamine, dibutylamine, butylphenylamine, etc.
Imidazole based blocking agents;
  Imidazole, 2-ethylimidazole, etc.
Urea based blocking agents;
  Urea, thiourea, ethylene urea, ethylene thiourea, 1,3-diphenylurea, etc.
Carbamate based blocking agents;
  Phenyl N-phenylcarbamate, 2-oxazolidone, etc.
Imine based blocking agents;
  Ethyleneimine, propyleneimine, etc.
Oxime based blocking agents;
  Formamidoxime, acetaldoxime, acetoxime, methyl ethyl ketoxime, diacetyl monoxime, benzophenoxime, cyclohexanoxime, etc.
Sulfite based blocking agents;
  Sodium bisulfite, potassium bisulfite, etc.

In cases in which a completely blocked isocyanate compound is utilized as the organic polyisocyanate compound, such completely blocked isocyanate compound may be obtained by reacting an organic polyisocyanate with a blocking agent normally at an equivalent ratio of (blocking agent)/(NCO)=about 1.0 to 1.3, preferably about 1.0 to 1.1, in an organic solvent not having active hydrogen or without solvent, although the reaction may be conducted in a large excess of the blocking agent.

In cases in which a partially blocked isocyanate compound is used as the organic polyisocyanate compound, such partially blocked isocyanate compound may be obtained by reacting an organic polyisocyanate with a blocking agent at an equivalent ratio of (blocking agent)/(NCO)=about 0.2 to 1.0, preferably about 0.3 to 0.9, in the organic solvent as described above or without solvent.

In the reaction of organic polyisocyanates with blocking agents, known catalysts such as tertiary amines and organic metals may be utilized. In cases where organic solvents are used and are required to be removed after the completion of the reaction, for example, spray dryer, drum dryer, thin-layer evaorator, etc. can be employed for removal of them or the solvents such as n-hexane, which do not dissolve the blocked organic polyisocyanates, can be added to allow the blocked organic polyisocyanates to precipitate, followed by filtering and drying. The melting point of completely blocked isocyanate compounds is in the range of not higher than ambient temperature to 200° C., preferably about 20° to 150° C. The melting point of partially blocked isocyanate compounds is not specifically restricted.

In cases in which a completely blocked isocyanate compound is utilized as the organic polyisocyanate compound, the polyurethane based compositions for powder coating uses according to this invention may be obtained by mixing it with (A) a hydroxyl-containing polymer, or its carboxyl-modified product, produced by hydrolyzing a copolymer of an vinyl ester of a saturated monocarboxylic acid and other vinyl monomers and (B) a polyester polyol of softening point of not lower than 40° C. containing not less than 30 weight % of a cyclohexylene or a cyclohexenylene group or spiro rings.

The mixing ratio is in the range of about 30 to 1000 parts by weight of the component (A) and about 30 to 1000 parts by weight of the component (B) against 100 parts by weight of the completely blocked isocyanate compound.

In case in which a partially blocked isocyanate compound is used as the organic polyisocyanate, it may be reacted in advance with (B) a polyester polyol of softening point of not lower than 40° C. containing not less than 30 weight % of cyclohexylene or cyclohexenylene group or spiro rings at an equivalent ratio of (OH)/(free NCO+blocked NCO)=about 0.1 to 2 in an organic solvent having no active hydrogen or without solvent.

In such case, the polyurethane based compositions for powder coating uses according to this invention may be obtained by mixing the above reaction product with (A) a hydroxyl-containing polymer, or its carboxyl-modified product, produced by hydrolyzing a copolymer of a vinyl ester of a saturated monocarboxylic acid and other polymerizable vinyl monomers.

The mixing ratio is in the range of about 5 to 2000 parts by weight of the component (A) against 100 parts by weight of the above-mentioned reaction product.

The polyurethane based compositions for powder coating uses according to this invention can be obtained also by reacting a partially blocked isocyanate compound with a mixture of (A) a hydroxyl-containing polymer, or its carboxyl-modified product, produced by hydrolyzing a copolymer of a vinyl ester of a saturated monocarboxylic acid and other polymerizable vinyl monomers and (B) a polyester polyol of softening point of not lower than 40° C. containing not less than 30 weight % of cyclohexylene or cyclohexenylene group or spiro rings.

Furthermore, the polyurethane based compositions for powder coating uses according to this invention can be obtained as well by reacting (B) a polyester polyol of softening point of not lower than 40° C. containing not less than 30 weight % of a cyclohexylene or a cyclohexenylene group or spiro rings with the organic polyisocyanate described hereinbefore at an equivalent ratio of (OH)/(NCO)=about 0.2 to 0.8, preferably about 0.3 to 0.6, in an organic solvent not having active hydrogens or without a solvent to form an adduct having free isocyanate groups at its terminals, followed by mixing the adduct after having its free isocyanate groups blocked with a blocking agent with (A) a hydroxyl-containing polymer, or its carboxyl-modified product, obtained by hydrolyzing a copolymer of a vinyl ester of a saturated monocarboxylic acid and other polymerizable vinyl monomers.

The mixing ratio of an adduct having its free isocyanate groups blocked with a blocking agent relative to the component (A) is in the range of about 10 to 2000 parts by weight against 100 parts by weight of the blocked adduct.

As the mixing procedure, there may be mentioned the known procedures such as dry-blending and melt-blending ones. On the occasion of mixing, dissociation catalysts, additives, pigments, dyes, levelling agents, etc. may be added, if necessary. The average particle size of the mixtures is in the range of about 5 to 500μ, preferably about 10 to 300μ.

By the above procedures, there may be obtained polyurethane based compositions for powder coating uses according to this invention, and for application to substrate materials of the compositions of this invention, the conventional powder coating techniques such fluidized-bed immersion, electrostatic coating and flame spraying are applied.

Substrate materials may be any material exemplified by metals, glass, concrete, ceramics, roofing tiles, etc. The application rate varies depending upon the use and is normally used in such quantities as may produce coating films of a thickness in the range of about 20 to 1000μ.

After application, heating in a heating furnace affords hardened coating films. Baking conditions depend upon whether or not catalysts are utilized and are normally in the range of about 130° to 230° C. of the substrate temperature for about 10 to 30 minutes. Baking at higher temperatures can reduce the baking time.

The coating films obtained by the above procedures, exhibit exceedingly improved hardness, heat resistance, toughness and transparency as compared with conventional polyolefin based powder coatings, and are advantageously useful for the cladding of guardrails, outdoor playing utensils, fences, etc., for the coating of bottles to prevent shattering of the bottles is an, anticorrosive lining for iron pipes, etc., and for finishing of articles for indoor uses, and the like.

Examples are given below to illustrate specifically this invention, whereby the term "part" designates "part by weight".

EXAMPLE 1

Four moles of methylhexahydrophthalic acid and 5 moles of hydrogenated bisphenol A were heated at 200° C. and allowed to react for 15 hours while removing the resulting water continuously out of the reaction system to thereby obtain a polyester polyol with acid value of 5, a hydroxyl number of 63 mgKOH/g, a melting point of 105° C. and a cyclohexylene group content of 64 weight %.

Then, 360 parts of the above polyester polyol and 111 parts of isophorone diisocyanate in ethyl acetate were heated at 80° C. and reacted for 3 hours, and 68 parts of ε-caprolactam were gradually added dropwise, followed by heating the mixture at the same temperature until no free isocyanate groups were detected. The solvent was removed, thereby yielding a solid product.

70 parts of a carboxyl-modified product obtained by grafting 0.3 weight % of acrylic acid onto a hydrolyzed product of an ethylene/vinyl acetate copolymer with an ethylene unit content of 89 mole % and vinyl alcohol unit content of 9 mole %, together with 30 parts of the above solid product, was melt-blended at 120° C. by use of an extruder, and subjected to machine-crushing to obtain a powder of average particle size of 100μ.

The composition was applied on a mild steel plate by the electrostatic coating process, and baked at 200° C. for 15 minutes resulting in a coating film of 200μ in film thickness.

EXAMPLE 2

Two moles of tetrahydrophthalic acid and 3 moles of a hydrogenated bisphenol A were heated at 200° C. and allowed to react for 10 hours while removing resulting water continuously out of the reaction system to thereby produce a polyester polyol with an acid value of 6, a hydroxyl number of 110 mgKOH/g, a melting point of 90° C., a cyclohexylene group content of 50 weight % and a cyclohexenylene group content of 16 weight %.

Then, 200 parts of the above polyester polyol and 97 parts of ω,ω'-diisocyanatodimethylcyclohexane in ethyl acetate were heated at 80° C. and reacted for 3 hours, and 53 parts of methyl ethyl ketoxime was gradually added dropwise, followed by heating the mixture at the same temperature until no free isocyanate groups were detected. Removal of the solvent afforded a solid product.

60 parts of a hydrolyzed product of an ethylene/vinyl acetate copolymer with an ethylene unit content of 86 mole % and a vinyl-alcohol unit content of 10 mole %, together with 40 parts of the above solid product, was melt-blended at 120° C. by use of an extruder and subjected to machine crushing to obtain a powder of average particle size of 90μ.

The composition was applied on a mild steel plate by the electrostatic coating process and baked at 180° C. for 15 minutes, resulting in a coating film of 200μ in film thickness.

EXAMPLE 3

Eight moles of methylhexahydrophthalic acid, 9 moles of hydrogenated bisphenol A and 1 mole of trimethylolpropane were heated at 200° C. and allowed to react for 20 hours while removing resulting water continuously out of the reaction system to thereby produce a polyester polyol with an acid value of 7, a hydroxyl number of 80 mgKOH/g, a melting point of 102° C. and a cyclohexylene group content of 61.6 weight %.

Then, 131 parts of 4,4'-methylenebis(cyclohexylisocyanate) and 68 parts of ε-caprolactam were reacted at 80° C. for 4 hours, followed by allowing 1000 parts of the above polyester polyol to react at 130° C. until no free isocyanate groups were detected.

65 parts of a carboxyl-modified product obtained by grafting 1.0 weight % of acrylic acid onto a hydrolyzed product of an ethylene/vinyl acetate copolymer with ethylene unit content of 82 mole % and vinyl-alcohol unit content of 13 mole %, together with 35 parts of the above reaction product, was melt-blended at 120° C. by use of an extruder and subjected to machine crushing to obtain a powder of average particle size of 110μ.

The composition was applied on a mild steel plate by the electrostatic coating process and baked at 200° C. for 15 minutes, resulting in a coating film of 200μ in film thickness.

EXAMPLE 4

Sixty parts of a carboxyl-modified product obtained by grafting 0.3 weight % of acrylic acid onto a hydrolyzed product of an ethylene/vinyl acetate copolymer with an ethylene unit content of 89 mole % and a vinyl-alcohol unit content of 9 mole %, 20 parts of a polyester polyol with acid value of 7, a hydroxyl number of 80 mgKOH/g, a melting point of 102° C. and a cyclohexylene group content of 61.6 weight % produced by heating at 200° C. 8 moles of methylhexahydrophthalic acid, 9 moles of hydrogenated bisphenol A and 1 mole of trimethylolpropane and reacting them for 20 hours while removing the resulting water continuously out of the reaction system, 111 parts of isophorone diisocyanate and 50 parts of hydrogenated bisphenol A were heated at 130° C. and allowed to react for 3 hours, and 68 parts of ε-caprolactam were gradually added dropwise, followed by heating the mixture at the same temperature until no free isocyanate group was detected. 20 parts of the blocked organic polyisocyanate thus obtained was melt-blended at 120° C. by use of an extruder, and subjected to machine crushing to obtain a powder of average particle size of 100μ. The composition was applied on a mild steel plate by the electrostatic coating process and baked at 200° C. for 15 minutes, resulting in a coating film of 200μ in film thickness.

EXAMPLE 5

Three moles of hexahydrophthalic acid, 1 mole of adipic acid, 4 moles of cyclohexanedimethanol and 1 mole of trimethylolpropane were heated at 200° C., and allowed to react for 20 hours while removing the resulting water continuously out of the reaction system to thereby produce a polyester polyol with an acid value of 4, a hydroxyl number of 145 mgKOH/g, melting point of 70° C. and a cyclohexylene group content of 47 weight %.

Then, 94 parts of ω,ω'-diisocyanatodimethylbenzene and 85 parts of p-phenylphenol in ethyl acetate were reacted at 80° C. for 40 hours, and 193 parts of the above polyester polyol was added, followed by heating the mixture at the same temperature until no free isocyanate groups were detected. Removal of the solvent afforded a solid product.

60 parts of the modified ethylene/vinyl acetate copolymer as described in Example 1, 40 parts of the above solid product and 20 parts of titanium dioxide were powdered by the same procedure as described in Example 1, applied on a mild steel plate by the electrostatic coating process and baked at 200° C. for 15 minutes, resulting in a coating film of 200μ in film thickness.

EXAMPLE 6

Melt-blended were 400 parts by weight of a polyester polyol (cyclohexylene group content of 61.6 weight %) obtained from 8 moles of methylhexahydrophthalic acid, 9 moles of hydrogenated bisphenol A and 1 mole of trimethylolpropane, 100 parts by weight of a blocked product of 1,3-xylylene diisocyanate with ε-caprolactam and 100 parts by weight of the acrylic-acid graft product of a hydrolyzed ethylene/vinyl acetate copolymer as used in Example 1, and the mixture was subjected to machine crushing to obtain a powder of average particle size of 100μ.

The composition was applied on a mild steel plate by the electrostatic coating process and baked at 200° C. for 15 minutes, resulting in a coating film of 200μ in film thickness.

REFERENCE EXAMPLE 1

A fine powder of the carboxyl-modified product of a hydrolyzed ethylene/vinyl acetate copolymer as used in Example 1 was applied on a mild steel plate by the same procedure as in Example 1, and baked at 180° C. for 15 minutes, resulting in a coating film of 200μ in film thickness.

REFERENCE EXAMPLE 2

A 60 part portion of the carboxyl-modified product as used in Example 1 and 40 parts of a blocked product of isophorone diisocyanate with ε-caprolactam were powdered by the same procedure as in Example 1, applied on a mild steel plate by the same procedure as in Example 1, and baked at 200° C. for 15 minutes, resulting in a coating film of 200μ in film thickness.

REFERENCE EXAMPLE 3

A 60 part portion of the carboxyl-modified product as used in Example 1 and 40 parts of a blocked product of isophorone diisocyanate/trimethylopropane adduct with ε-caprolactam were powdered by the same procedure as in Example 1, applied on a mild steel plate by the same procedure as in Example 1, and baked at 200° C. for 15 minutes, resulting in a coating film of 200μ in film thickness.

REFERENCE EXAMPLE 4

A 400 part portion of the polyester polyol as obtained in Example 6 and 100 parts by weight of a blocked product of 1,3-xylylene diisocyanate with ε-caprolactam were melt-blended and subjected to machine crushing to produce a powder of 100μ of average particle size.

The composition was applied on a mild steel plate by the electrostatic coating process and baked at 200° C. for 15 minutes resulting in a coating film of 200μ in film thickness.

TABLE 1

|  | Example 1 | Example 2 | Example 3 | Example 4 | Example 5 | Example 6 |
|---|---|---|---|---|---|---|
| Appearance of coating film | Transparent | Transparent | Transparent | Transparent | Good | Transparent |
| Hardness (pencil) | 6B | 4B | 5B | 3B | 4B | F–H |
| Bending test 2 mmφ | Intact | Intact | Intact | Intact | Intact | Intact |
| Erichsen test 8 mm | Intact | Intact | Intact | Intact | Intact | Intact |
| Solvent resistance (ethyl acetate) | Intact | Intact | Intact | Intact | Intact | Intact |
| Weatherability after 1000 hrs. | Intact | Intact | Intact | Intact | Intact | Intact |
| Water resistance (70° C. × 2 hrs.) | Intact | Intact | Intact | Intact | Intact | Intact |
| Alkali resistance (4% NaOH, 70° C. × 3 hrs.) | Intact | Intact | Intact | Intact | Intact | Intact |
| Storage stability of powder (40° C. × 2 weeks) | Intact | Intact | Intact | Intact | Intact | Intact |

TABLE 2

|  | Reference Example 1 | Reference Example 2 | Reference Example 3 | Reference Example 4 |
|---|---|---|---|---|
| Appearance of coating film | Slightly opaque | Transparent | Bad surface and opaque | Transparent |
| Hardness (pencil) | 6B> | 6B> | 6B | H |
| Bending test 2 mmφ | Intact | Intact | Intact | Cracked |
| Erichsen test 8 mm | Intact | Intact | Intact | Cracked |
| Solvent resistance (ethyl acetate) | Intact | Intact | Intact | Poor |
| Weatherability after 1000 hrs. | Whitening & cracking | Intact | Intact | Intact |
| Water resistance (70° C. × 2 hrs.) | Exceedingly cloudy | Intact | Intact | Blister |
| Alkali resistance (4% NaOH, 70° C. × 3 hrs) | Exceedingly cloudy | Intact | Intact | Blister |
| Storage stability of powder (40° C. × 2 weeks) | Intact | Exceedingly massive | Intact | Intact |

EXAMPLE 7

Twelve moles of methylhexahydrophthalic acid, 15 moles of hydrogenated bisphenol A and 1 mole of trimethylpropane were heated at a temperature of 200° to 215° C. for 20 hours while removing the resulting water continuously out of the reaction system to thereby produce a polyester polyol with an acid value of 8, a hydroxyl number of 92 mgKOH/g, a melting point of 115° C. and a cyclohexylene group content of 62 weight %.

On the other hand, 97 parts of 1,3-bis(isocyanato methyl)cyclohexane and 79 parts of ε-caprolactam were reacted at 90° C. for 6 hours, followed by allowing the reaction product to react with 165 parts of the above polyester polyol at 150° C. until no free isocyanate groups were detected.

55 parts of the modified ethylene/vinyl acetate copolymer as described in Example 1 and 45 parts of the above solid product were melt-blended at 120° C. by use of an extruder and subjected to machine crushing to obtain a powder of average particle size of 100μ.

The composition was applied on a mild steel plate by the electrostatic coating process and baked at 200° C. for 15 minutes, resulting in a coating film of 200μ in film thickness.

EXAMPLE 8

Five moles of methylhexahydrophthalic acid, 4 moles of spiro glycol and 2 moles of trimethylolpropane were heated at a temperature of 200° to 215° C. for 20 hours while removing the resulting water continuously out of the reaction system to thereby produce a polyester polyol with an acid value of 6, a hydroxyl number of 100 mgKOH/g, a melting point of 95° C., a cyclohexylene group content of 18 weight % and a spiro rings content of 31 weight %.

On the other hand, 97 parts of 1,4-bis(isocyanato methyl)cyclohexane and 79 parts of ε-caprolactam were reacted at 90° C. for 5 hours, followed by allowing the reaction product to react with 167 parts of the above polyester polyol at 140° C. until no free isocyanate groups were detected.

60 parts of the modified ethylene/vinyl acetate copolymer as described in Example 1 and 40 parts of the above solid product were melt-blended at 120° C. by use of an extruder and subjected to machine crushing to obtain a powder of average particle size of 100μ.

The composition was applied on a mild steel plate by the electrostatic coating process and baked at 200° C. for 15 minutes, resulting in a coating film of 200μ in film thickness.

EXAMPLE 9

Five moles of succinic anhydride and 6 moles of spiro glycol were heated at a temperature of 200° to 215° C. for 15 hours while removing the resulting water continuously out of the reaction system to thereby produce a polyester polyol with acid value of 5, a hydroxyl number of 51 mgKOH/g, a melting point of 80° C. and a spiro rings content of 46 weight %.

On the other hand, 111 parts of isophorone diisocyanate and 61 parts of methyl ethyl ketoxime were reacted at 70° C. for 3 hours, followed by allowing the reaction product to react with 440 parts of the above polyester polyol at 130° C. until no free isocyanate groups were detected.

60 parts of the modified ethylene/vinyl acetate copolymer as described in Example 2 and 40 parts of the above solid product were melt-blended at 120° C. by use of an extruder and subjected to machine crushing to obtain a powder of average particle size of 100μ.

The composition was applied on a mild steel plate by the electrostatic coating process and baked at 170° C. for 15 minutes, resulting in a coating film of 200μ in film thickness.

TABLE 3

|  | Example 7 | Example 8 | Example 9 |
| --- | --- | --- | --- |
| Appearance of coating film | Transparent | Transparent | Transparent |
| Hardness (pencil) | 2B | 3B | 4B |
| Bending test 2 mmφ | Intact | Intact | Intact |
| Erichsen test 8 mm | Intact | Intact | Intact |
| Solvent resistance (ethyl acetate) | Intact | Intact | Intact |
| Weatherability after 1000 hrs. | Intact | Intact | Intact |
| Water resistance (70° C. × 2 hrs.) | Intact | Intact | Intact |
| Alkali resistance (4% NaOH, 70° C. × 3 hrs.) | Intact | Intact | Intact |
| Storage stability of powder (40° C. × 2 weeks) | Intact | Intact | Intact |

What is claimed is:

1. A polyurethane based powder composition for powder coating uses, consisting essentially of a combination of a completely or partially blocked isocyanate compound or mixtures thereof and a hydroxyl-containing compound, the hydroxyl-containing compound being
   (A) A hydroxyl-containing polymer, or its carboxyl-modified product, obtained by hydrolyzing a copolymer of a vinyl ester of a saturated monocarboxylic acid and other polymerizable vinyl monomers, and
   (B) A polyester polyol of a softening point not lower than 40° C., containing not less than 30 weight % of cyclohexylene, cyclohexenylene groups or spiro rings.

2. A composition as claimed in claim 1, wherein the partially blocked isocyanate is reacted in advance with the component (B) and the reaction product of the partially blocked isocyanate compound and the component (B) is used in combination with the component (A).

3. A composition as claimed in claim 1, wherein and the partially blocked isocyanate compound is reacted with a mixture of the components (A) and (B).

4. A composition as claimed in claim 1, wherein a product obtained by reacting the component (B) with excess of the isocyanate compound to produce an adduct having free isocyanate groups at its terminals, followed by blocking the free isocyanate groups with a blocking agent, is used in combination with the component (A).

5. A composition as claimed in claim 1, wherein the copolymer of a vinyl ester of a saturated carboxylic acid and other polymerizable vinyl monomers is a copolymer of vinyl acetate and ethylene.

6. A composition as claimed in claim 1, wherein the hydroxyl number of the polyester polyol is in the range of about 5 to 300 mgKOH/g.

7. A composition as claimed in claim 1, wherein the mixing ratio of the hydroxyl-containing compound relative to the completely blocked isocyanate compound is in the range of about 30 to 1000 parts by weight of the component (A) and about 30 to 1000 parts by weight of the component (B) against 100 parts by weight of the completely blocked isocyanate compound.

8. A composition as claimed in claim 1, wherein the completely blocked isocyanate compound is a completely blocked product of 1,3-xylylene diisocyanate with ε-caprolactam.

9. A composition as claimed in claim 2, wherein the mixing ratio of the component (A) relative to the reaction product of the partially blocked isocyanate compound and the component (B) is in the range of about 5 to 2000 parts by weight of the component (A) against 100 parts by weight of the reaction product.

10. A composition as claimed in claim 2, wherein the partially blocked isocyanate compound is one obtained by the reaction of 1,3-bis(isocyanatomethyl)cyclohexane and ε-caprolactam, the component (B) is a polyester polyol obtained by the reaction of methylhexahydrophthalic acid, hydrogenated bisphenol A and trimethylolpropane and the component (A) is a carboxyl-modified product obtained by grafting acrylic acid onto a hydrolyzed product of an ethylene/vinyl acetate copolymer.

11. A composition as claimed in claim 4, wherein the mixing ratio of the adduct having free isocyanate groups blocked with a blocking agent relative to the component (A) is in the range of about 10 to 2000 parts by weight against 100 parts by weight of the blocked adduct.

* * * * *